(12) United States Patent
Nolan et al.

(10) Patent No.: US 8,818,932 B2
(45) Date of Patent: Aug. 26, 2014

(54) METHOD AND APPARATUS FOR CREATING A PREDICTIVE MODEL

(75) Inventors: James J. Nolan, Springfield, VA (US); Mark E. Frymire, Arlington, VA (US); Jonathan C. Day, Springfield, VA (US); Peter F. David, Herndon, VA (US)

(73) Assignee: Decisive Analytics Corporation, Arlington, VA (US)

( * ) Notice: Subject to any disclaimer, the term of this patent is extended or adjusted under 35 U.S.C. 154(b) by 471 days.

(21) Appl. No.: 13/239,180

(22) Filed: Sep. 21, 2011

(65) Prior Publication Data

US 2012/0323558 A1 Dec. 20, 2012

Related U.S. Application Data

(60) Provisional application No. 61/442,508, filed on Feb. 14, 2011.

(51) Int. Cl.
*G06N 5/04* (2006.01)
*G06N 7/00* (2006.01)
*G06F 17/27* (2006.01)

(52) U.S. Cl.
CPC .............. *G06F 17/271* (2013.01); *G06N 7/005* (2013.01); *G06F 17/2785* (2013.01)
USPC .......................................................... 706/55

(58) Field of Classification Search
CPC ....................................................... G06K 9/00
USPC ......................................................... 706/12
See application file for complete search history.

(56) References Cited

U.S. PATENT DOCUMENTS

| | | |
|---|---|---|
| 7,187,790 B2 | 3/2007 | Sabol et al. |
| 7,403,890 B2 | 7/2008 | Roushar |
| 7,490,085 B2 | 2/2009 | Walker et al. |
| 2002/0103793 A1 | 8/2002 | Koller et al. |
| 2008/0319947 A1 | 12/2008 | Latzina et al. |
| 2009/0006156 A1 | 1/2009 | Hunt et al. |
| 2010/0049684 A1 | 2/2010 | Adriaansen et al. |
| 2010/0100546 A1 | 4/2010 | Kohler |
| 2010/0114629 A1 | 5/2010 | Adler et al. |
| 2010/0205128 A1* | 8/2010 | Nolan et al. .............. 706/13 |

FOREIGN PATENT DOCUMENTS

| | | |
|---|---|---|
| EP | 1750221 A1 | 2/2007 |
| WO | 2004061742 A2 | 7/2004 |

* cited by examiner

*Primary Examiner* — Jeffrey A Gaffin
*Assistant Examiner* — Ola Olude Afolabi
(74) *Attorney, Agent, or Firm* — Daniel A. Thomson; Emerson Thomson Bennett, LLC

(57) ABSTRACT

A method for creating a predictive model is disclosed herein, including the steps of determining trends and patterns in electronic data, using at least a first machine language algorithm, refining the determination of the algorithm, searching for social models that describe the identified trends and patterns using at least a second machine language algorithm, verifying causal links, constructing at least one model about human node behavior and interactions, utilizing the social models to do at least one of the following: validate hypotheses, predict future behavior, and examine hypothetical scenarios, automatically updating predictions when new data is introduced, using probabilistic techniques to learn hierarchical structure in unstructured text, continuously updating a set of themes, examining grammatical rules of each component of text, matching grammatical constituents to semantic roles, and reorganizing data into clusters of entities with common attributes.

16 Claims, 13 Drawing Sheets

METHOD AND APPARATUS FOR CREATING A PREDICTIVE MODEL

This application claims the benefit of U.S. Ser. No. 61/442,508, filed Feb. 14, 2011, entitled Method and Apparatus for Creating a Predicting Model, which is herein incorporated by reference.

BACKGROUND

The present invention relates generally to a method to understand the organization and operation of terror networks, the political and cultural terrain of the Middle East and the processing of massive, complex, and diverse intelligence data sets. In particular, an automated and streamlined application of the scientific method and specialized expert knowledge to the problem of predicting and preventing violence against U.S. and friendly forces.

DESCRIPTION OF THE RELATED ART

Gathering the necessary information to reliably predict and anticipate the behavior of terrorist groups in order to preempt their actions remains a difficult challenge. Scientists and defense personnel interested in anticipating and countering an irregular opponent must rely on content analysis of intelligence data to develop and evaluate hypotheses about enemy patterns and behaviors. In an insurgency—a type of conflict characterized as a "learning contest" due to the extreme flexibility and adaptability of insurgent tactics and operations—the force that is able to perform the most thorough and rapid exploitation of its intelligence data may gain an important advantage. This learning contest provides a sharp contrast to a static form of the same problem. Because the enemy is constantly changing their tactics, a learning contest requires tools and systems that can resolve and readjust solutions on an ongoing basis.

Existing approaches to understand and model battlespace actors and populations are of limited utility because they are either too qualitative or too quantitative. Social Scientists can provide a rich and deep understanding of the enemy's actions and reactions to blue force activity. Unfortunately, not all military analysts have access to these types of subject matter experts (SMEs). Therefore, qualitative efforts are often obscured by the biases and preconceived notions of the analyst and can produce inaccurate characterizations of the enemy. For example, analysts tend to project the structure of their own organizations and command relationships onto enemy groups whose structure may be much different or may be non-existent. Quantitative, Machine Learning (ML) approaches to modeling battlespace entities avoid these biases by relying exclusively on patterns and correlations within the available data to generate models and predictions. However, ML approaches provide few opportunities for Subject Matter Experts (SMEs) such as social and behavioral scientists, terrorism experts, and cultural experts, to use their own knowledge to guide the analysis process. ML techniques are usually unable to make use of expert knowledge and intuition or react to rapidly changing battlespace conditions as is very often required in the "learning contests" described above.

SUMMARY

According to one embodiment, a method for creating a predictive model includes determining trends and patterns in electronic data, using at least a first machine language algorithm, refining the determination of the algorithm, searching for social models that describe the identified trends and patterns using at least a second machine language algorithm, verifying causal links, constructing at least one model about human node behavior and interactions, utilizing the social models to do at least one of the following: validate hypotheses, predict future behavior, and examine hypothetical scenarios, automatically updating predictions when new data is introduced, using probabilistic techniques to learn hierarchical structure in unstructured text, continuously updating a set of themes, examining grammatical rules of each component of text, matching grammatical constituents to semantic roles, and reorganizing data into clusters of entities with common attributes.

According to anther embodiment, a method for accurately predicting behavior includes providing intelligence analysts with the algorithms and capabilities, conglomerating the individual models into a large-scale behavioral prediction model, accessing the results of the algorithms to validate and/or modify the results of the model construction process by an associate SME, wherein the algorithm comprises content discovery, Entity & Attribute Association, Latent Structure Discovery, Bayesian Network Structure Discovery. Associate Entity-Level Frames, and Finding Optimal Bayesian Networks.

One advantage is an approach to the problem of winning the learning contest by combining the creativity, experience, and intuition of SMEs with a powerful suite of data mining, machine learning (ML), and social network modeling algorithms.

Another advantage is a partnership between the human expert and the advanced ML algorithms that amplifies the capabilities of both to create an innovative and multi-disciplinary social network modeling service with a team whose background matches the problem space.

Still another advantage is the modeling service may be a result of the collaboration of experts in sociology, political science, mathematics, and engineering. The result may be an accelerated inductive reasoning and learning process that produces automatable, expressive, high-fidelity social models of the battlespace.

Still other benefits and advantages of the invention may become apparent to those skilled in the art to which it pertains upon a reading and understanding of the following detailed specification.

DEFINITIONS

The following terms may be used throughout the descriptions presented herein and should generally be given the following meaning unless contradicted or elaborated upon by other descriptions set forth herein.

Attribute—A quality or feature regarded as a characteristic or inherent part of an entity.

Categorizational model—A model describing the division of entities or attributes into classes based on having particular shared characteristics.

Causal link—A connection between two things that express or indicate one causes the other.

Entity—A thing with distinct and independent existence.

Event—Something that happens at a given place and time.

Fully polynomial randomized approximation scheme—A type of approximation algorithm for optimization problems in which the runtime is polynomial in both the size of the problem and the required accuracy of the approximate answer.

Hierarchical structure—A structure of data having several levels arranged in a treelike structure.

Human-in-the-loop user interface—An interface between an end-user and a computational system that allows the end-user to modify or alter the analytical process and/or results during the computational analysis process.

Human node behavior—A model that characterizes the responses and actions of a social network node representing a specific human or class of humans.

Joint probabilistic data association—The development of a model governing the connections or links between data points based on probabilistic techniques that utilizes multiple data sources concurrently.

Model—A mathematical and/or graphical representation of a system.

Pattern—A regular and intelligible form or sequence discernible in certain actions or situations.

Probabilistic techniques—A methodology that is based on or adapted to a theory of probability and is subject to or involves chance variation.

Relational modeling—The development of a model governing the relationships held between entities and/or attributes.

Relationship—The way in which two or more concepts, objects, or people are connected.

Segments—Each of the parts into which something is or may be divided.

Semantic roles—The function assumed or part played by a word or entity with regard to the transfer of meaning through language.

Social model—A model describing the way in which social entities (i.e. people, organizations) relate to each other.

Structured text—A collection of text follows a specified format. Typically consisting of keys and associated values.

Themes—A collection of ideas or subjects discussed within a corpora.

Trend—A general direction in which something is developing or changing.

Unstructured text—A collection of text that is not required to follow any governing format.

BRIEF DESCRIPTION OF THE DRAWINGS

The invention may take physical form in certain parts and arrangement of parts, embodiments of which may be described in detail in this specification and illustrated in the accompanying drawings which form a part hereof and wherein.

DETAILED DESCRIPTION

Figure 1:
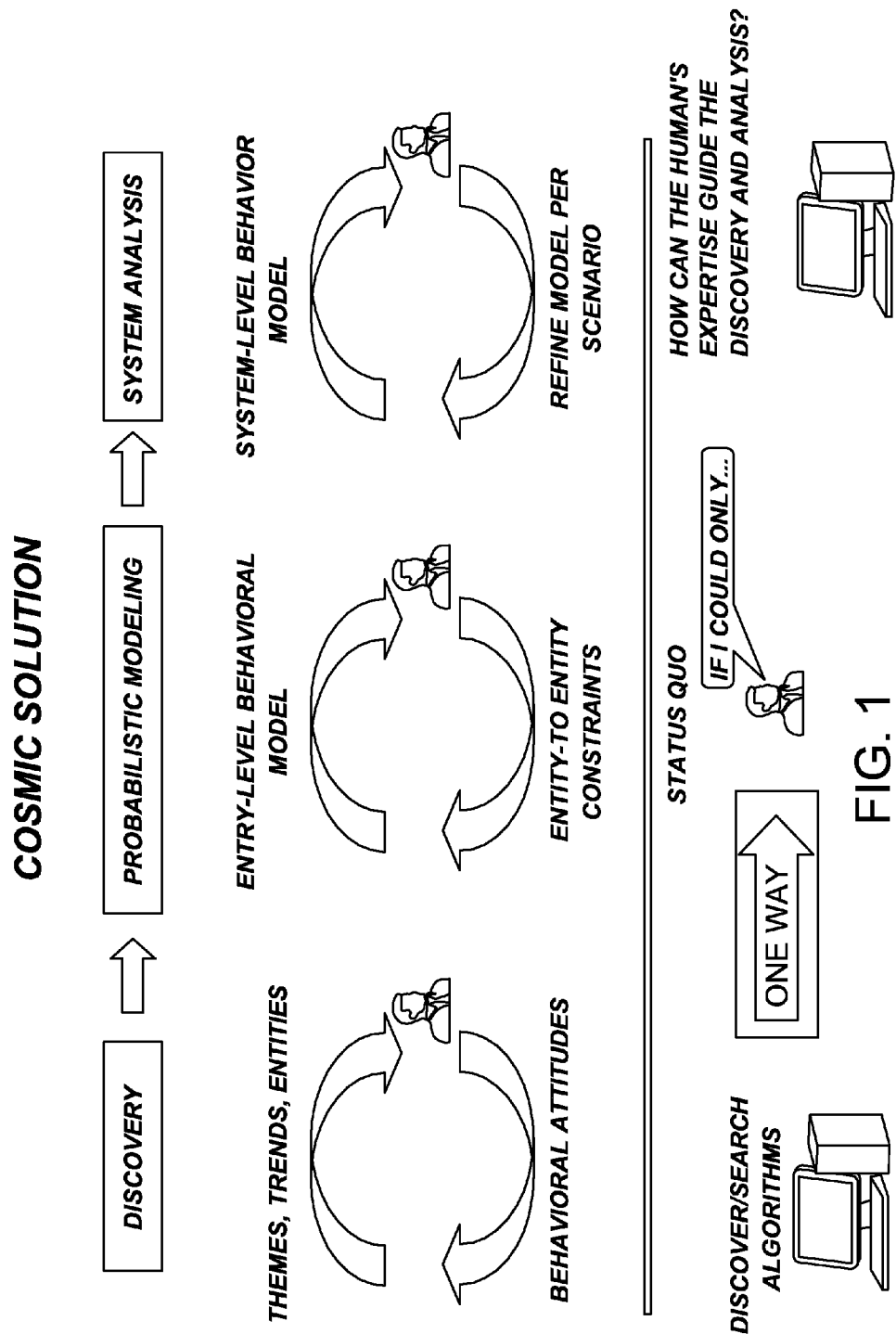
FIG. 1 is a comparison of a flow chart of the present invention and the status quo.

Referring now to the drawings wherein the showings are for purposes of illustrating embodiments of the invention only and not for purposes of limiting the same, FIG. 1 shows the present invention's approach to social network analysis and modeling involving Subject Matter Experts (SMEs) at each stage of analysis, allowing them to take advantage of advanced data-mining and social-network-modeling algorithms, while simultaneously using their intuition and knowledge to influence the algorithms' behavior. Within the present invention, the analysis process is divided into three broad phases: Discovery of the information present in the available data, Probabilistic Modeling of social networks, and Analysis using the models to understand the current situation and predict future events. In the various embodiments, one option for the computer system is a Dual Quad core, 32-GB RAM, 64-bit OS.

In the Discovery phase, data-mining algorithms, such as topic discovery and semantic role labeling, uncover trends and patterns in the available data. The SME uses intuition and background knowledge to refine the content analysis performed by the data-mining algorithms. In each cycle, the SME is able to dig deeper into the data to identify critical factors, root causes and the latent variables that influence textual content. SMEs may be able to account for the credibility of source data, interact with the data-mining process to focus on data that is relevant to the theories and hypotheses under scrutiny, and identify and discount the biases and prejudices that color the data.

In the Probabilistic Modeling phase, machine learning algorithms search for social models that describe the identified patterns and trends. SMEs influence this step by adjusting the features modeled, introducing constraints and verifying causal links and constructing models or model-fragments that describe their hypotheses about human node behaviors and interactions. The present invention's probabilistic modeling services may build on the extensive research into the development of sophisticated probabilistic tools designed for use by non-mathematicians.

In the System Analysis phase, SMEs use the social models to validate hypotheses, predict future behavior, and examine "what if" scenarios. The models' predictions are automatically updated to accommodate new data as it arrives, providing the defense personnel with timely understanding of the battlespace and probabilities of future events. The results of the System Analysis phase can be considered the deliverable of the entire analytical process. The System Analysis facility can produce answers to the types of inquires that defense personnel ask.

The present invention has developed advanced techniques to automatically identify networks of suspicious activity while also predicting their intent using semantic role labeling and cross categorization. The present invention provides the capability to ingest disparate sources of intelligence data, identify key actors and organizations, detect suspicious behavior, and predict and evaluate possible formations of social networks.

The present invention provides algorithms to predict significant events and/or relationships using datasets that may contain geospatial and/or temporal data. The system of the present invention is capable of automatically discovering relationships, patterns and connections between diverse sources of geospatial and/or temporal data, along with the associated probabilities that these discovered items exist. It then uses these discovered relationships to provide improved battlespace awareness and to model and predict enemy intent. The present invention is based on a hypothesis management technique that is capable of processing large, computationally complex relationships and interactions and may include a continuous searching capability that dynamically evaluates new possible relationships between events as new data is observed. In effect, the present invention provides a model discovery capability that improves model cohesion and reduces analysis time. This effort is designed to support a battlefield effort and is designed to operate on structured and unstructured data typically available to battlefield analysts.

The work present here may make the existing advanced algorithms more accessible to subject matter experts (SME) with non-mathematical backgrounds and may enhance and refine the modeling and predictive performance of the existing software. Through leading edge use of data-mining and probabilistic modeling techniques and the use of intuitive interfaces to complex algorithms, the present invention is uniquely positioned to provide the cutting edge technology presented here.

The first capabilities provided by the present invention allow for rapid, semi-automated preparation of both unstructured and structured textual and numeric data. This capability is provided through the utilization of four key algorithms: a Hierarchical Theme Discovery System (HTDS), a Multidimensional Scaling (MDS) capability, a Semantic Role Labeling (SRL) capability, and an Infinite Relational Modeling (IRM) capability. The benefits and nature of each of these algorithms are discussed in the following paragraphs.

The Hierarchical Theme Discovery System (HTDS) is a probabilistic technique that learns a hierarchical structure among themes in a corpus of unstructured text reports. This approach represents data as a mixture of super-themes and sub-themes, and calculates an affinity measure across topics with respect to identified entities. HTDS operates in an online environment, continuously updating the set of themes as new documents are made available over time.

Multidimensional Scaling (MDS) is an algorithm which transforms the output of the model discovery system into a snapshot of a social network. Because MDS produces a network in which the relative positions of entities actually means something (entities placed close together are more likely to be related), the present invention can infer that entities which are tightly grouped are likely to have strong associations.

Semantic Role Labeling (SRL) is a technique that identifies entity attributes and inter-relationships between entities by examining the grammatical role of each phrase or component of the sentences in a corpus. By matching the grammatical constituents of a sentence to the semantic roles associated with the sentence's verbs, a SRL system can extract detailed information about the who, when, where, and how of the subjects in a dataset.

Infinite Relational Modeling (IRM) is a statistical technique that separates entities into distinct groups based on their relationships and attributes. IRM can be thought of as a "stereotype generation" mechanism and organizational structure discovery mechanism; the algorithm partitions attributes into coherent subsets. By virtue of its underlying allocation model, IRM can reorganize data into clusters of entities with common attribute and relationship sets. Each attribute set produces a high-level feature, labeled by a subject matter expert (e.g. does/does not desire martyrdom or acts like an operative/acts like a leader/acts like a sympathizer) and backed by a rich set of entity attribute data. A subject matter expert may be required to set or modify variables and state spaces after IRM has been run.

The HTDS, MDS, SRL, and IRM capabilities may be linked together by a user interface with the backbone of a service-oriented architecture where an SME can utilize the results along each step. The output of the multidimensional scaling process can be manipulated to add or remove links, define linked entities as being the same entity, or reclassify entities as people/locations/organizations. The annotations generated by SRL can also be redefined as necessary. The specifics on how these techniques can be utilized and applied are described in detail in the work plan.

As a benefit to the user, these combined capabilities may provide a system that presents subject matter experts with information that can help drive their information discovery process. This architecture may enable the SME to quickly sort through the data and access the information that they deem most important, all the while aided by machine learning algorithms. The machine learning algorithms may also aid the SME in discovering necessary relationship and specific entity information in a large sea of data.

The invention provides interfaces that can collect subject matter knowledge and demonstrate the resulting mathematical model, and an infrastructure that enables subject matter experts to capture their knowledge within a Bayesian network model. Expert knowledge is often qualitative and complex. Theories regarding the causes and symptoms of "at risk" individuals and populations cannot be applied to real-world data sets using simpler mechanisms like keyword searches. These interfaces capture SME knowledge in a formal way that enables automated processing but that does not remove subtlety or meaning from the SME's guidance. Thereby, providing a mathematical model and mechanism based on machine learning that can capture subject matter expertise.

As a benefit to the Analysts, the present invention provides a mechanism for capturing and storing subject matter expertise regarding key individuals' behaviors and attributes. This technical objective may provide the foundation for the GUI that combines machine learning and subject matter expertise. The interface may support utilization and storage of these models for different sets of users. This provides the analyst with models that can be utilized in real-time and subject matter experts with models that can be re-used and updated as new data becomes available.

The present invention demonstrates the use and value of the combined machine learning and subject matter expert architectures in an online environment to apply the semantic network model to arrive at accurate conclusions about the future behavior of individuals or groups.

The present invention utilizes technologies allowing a user who is unfamiliar with Bayesian networks to develop a predictive network model. The present invention utilizes these techniques to allow a subject matter expert to build frame models representing behavioral attributes. As a Human-Centric System designed for SMEs that are not computer scientists so as to create a system which captures their knowledge in the most complete and accurate fashion, the interface must be intuitive and polished. The present invention also remembers that computer scientists are not social scientists—a subject matter expert's breadth of knowledge is typically far more extensive than that of any computer system which would seek to do similar work. Therefore, a system was designed to capture SME knowledge. The SME has ample opportunity provided to make corrections or changes. To accomplish this technical objective, the present invention proposes a human-in-the-loop user interface, guided by the SMEs, who are social and political scientists, which allows a SME to change attributes, behaviors, relationships, and other portions of the model.

During the prototyping effort, the present invention makes improvements to the user interface based on the execution of a cognitive work flow analysis of the user interface (UI) along with user feedback. The cognitive work flow analysis is a mechanism that the present invention uses to ensure several key traits exist within the developed UI. These traits include the proper arrangement of buttons and information (to minimize the amount of movement required between actions), optimization of the amount of information displayed (to ensure only relevant and necessary data is presented to the user), and flexibility within the UI for a user to adjust settings to fit their own preferences. As a benefit to the Analysts, this technical objective may demonstrate how mathematical models built by subject matter experts can be utilized in real-time. The analyst may be able to use these models for planning and analysis purposes. This technical objective provides an end system that updates the developed models in real-time, based on incoming data.

Figure 2:
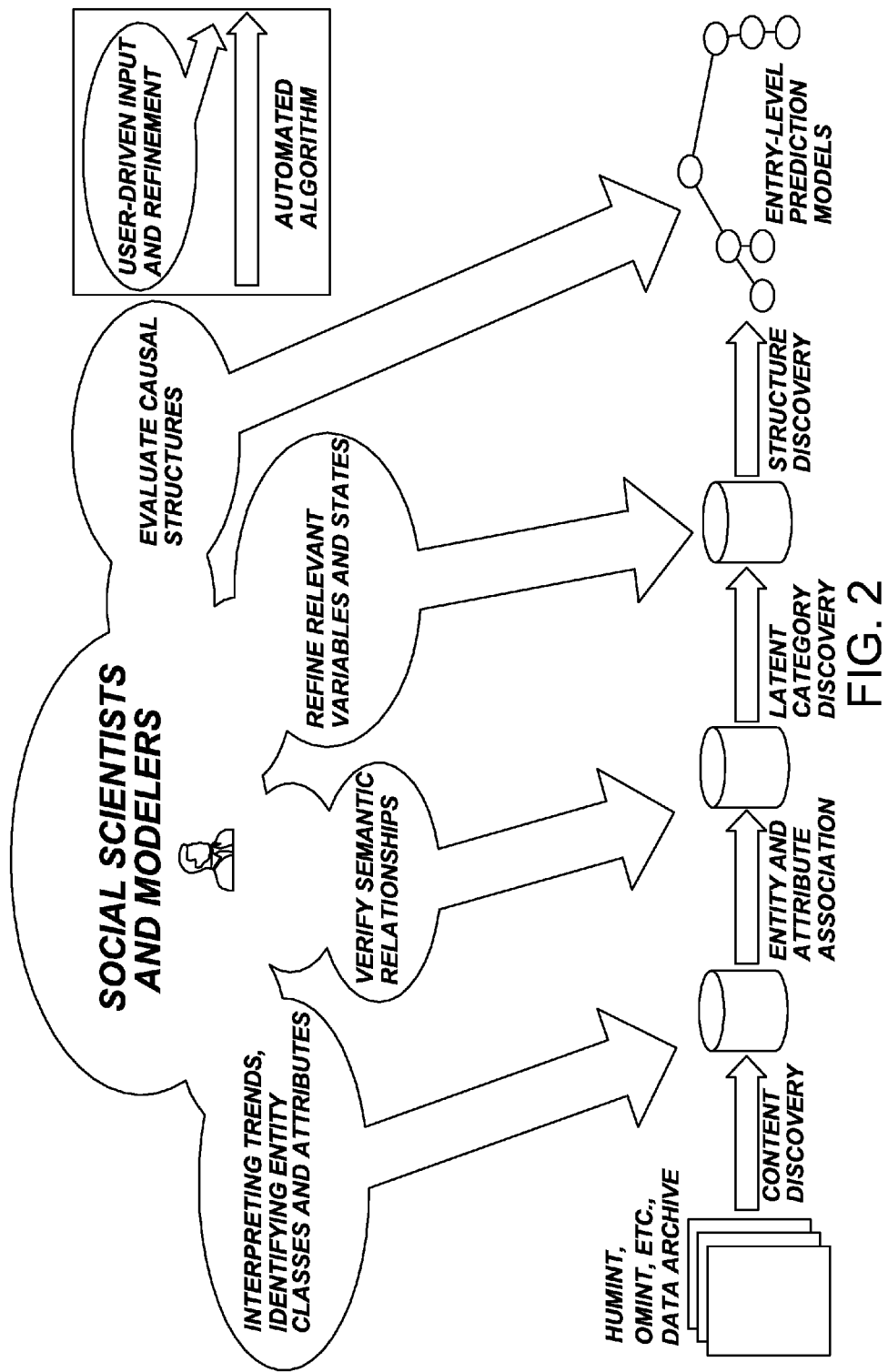
FIG. 2 is a flow chart of the offline workflow.
Figure 3:
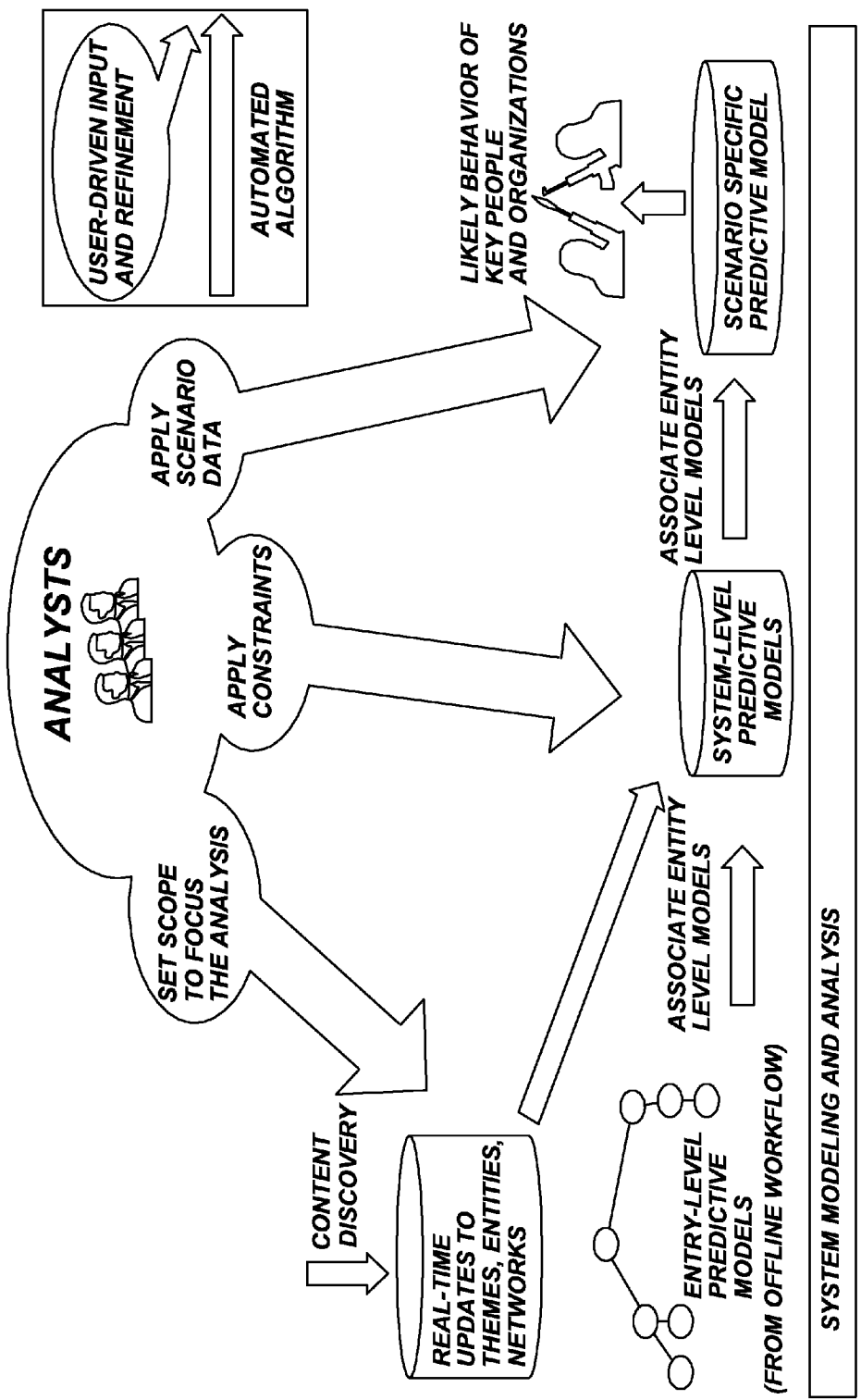
FIG. 3 is a flow chart of the online workflow.

The present invention may expeditiously develop accurate behavioral prediction models by combining the benefits of both machine learning algorithms and Subject Matter Expert knowledge. An overview of the proposed work flow to accomplish this goal is shown in FIG. 2 and FIG. 3. This work flow is split into two parts: an offline workflow and an online workflow. The offline workflow is based on the forensic utilization of historic and archived data and is used to develop the models that may be used within the online workflow. The online workflow applies "live" data to the mathematical models developed within the offline workflow to help the analyst draw conclusions. Both of these workflows utilize several machine learning algorithms, including model discovery, semantic role labeling, Infinite Relational Modeling and Bayesian Network discovery algorithms.

The architecture of the present invention is designed based on the conversion of the stand-alone algorithms into "plug-and-play" appliances with Java APIs (application programming interfaces). This architectural approach allows each algorithm to be switched in and out as necessary.

With reference now to FIG. 2, the Offline portion of the present invention's workflow combines machine learning capabilities with SME knowledge to convert historic structured and unstructured data into behavioral prediction models. The application may ingest large scale corpora of structured and/or unstructured text; aid the SME in performing Discovery Services on the documents, resulting in the selection of a set of variables and associated data to use within the model; and then utilize Probabilistic Modeling algorithms to help the SME generate entity-level probability models. The system is designed to present the SME with information that can help them with their analysis but also allows them, throughout the process, to input new knowledge not captured by the machine learning algorithms. These models are then used within the Online workflow described below.

With reference now to FIG. 3, the Online portion of the present solution's workflow is responsible for taking the probabilistic behavior prediction models developed within the Offline workflow and allowing intelligence analysts to analyze and apply "live" structured and unstructured data to the developed predictive models.

Figure 4:
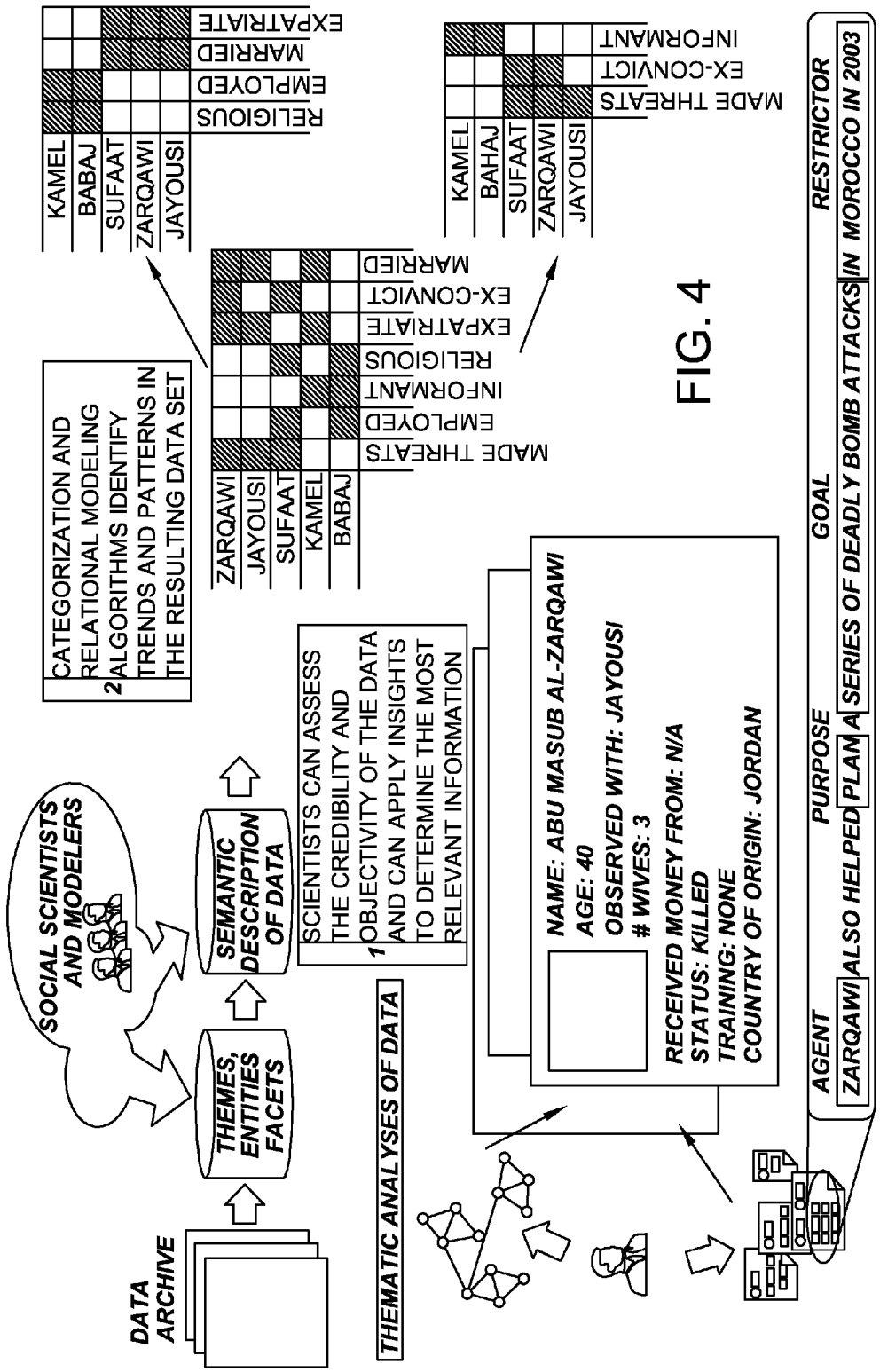
FIG. 4 is a depiction of the discovery phase of the offline workflow.

The Discovery stage of the present invention's framework is centered on the use of the SME's knowledge and the mathematical algorithms to extract meaningful and useful information from large-scale collections of unstructured and structured data. The extracted information may contain the key items pertaining to the prediction model being developed and their associated attributes, relationships, behaviors, etc. The workflow of the Discovery stage is depicted in FIG. 4—Depiction of the Discovery phase of the offline workflow. The first step (1) provides both the models and semantic analysis of the data. The SMEs can assess the credibility and objectivity of data and can apply insights to determine the most relevant information. The second step (2) provides categorization and relational modeling algorithms that allow the scientist to identify trends and patterns in the resulting data set. During Content Discovery, the first process within the Discovery stage, large-scale unstructured text corpora may be distilled into a collection of information dense figures and documents that describe the content of the entire corpora. This process provides two key benefits: 1) It allows the SME to quickly understand the details associated with the specific area of interest and 2) It allows for the removal of documents from the corpora that are unrelated to this area of interest. Technologies capable of providing this capability are:

Within this step, the SME may be able to interact with the information provided by the provided algorithms; determine the models, networks, and events associated with the area of interest; and help select the documents directly pertaining to the current model being developed.

Once the framework of the problem is set and unrelated documents have been removed, the next step is to understand what variables are available for consideration within the model and what data is available to use as training material for the model learning process. This information may be obtained through the use of entity and attribute extraction and association algorithms.

Entity and Attribute Extraction—The extraction of the entities and attributes contained within the corpora may be accomplished through the use of the Context-Free Grammar (CFG) Parsing and Semantic Role Labeling (SRL) algorithms. By parsing each sentence contained within the distilled corpora produced within the Content Discovery step of COSMIC, based on parts of speech and relative position, these algorithms are capable of not only extracting the entities and attributes within the corpora, but also of discovering how they are related to each other.

Entity and Attribute Association—A simple list of the entities and attributes contained within the corpora is of only minimal value. However, a collection of associations between entities, entity-attribute pairings, and attribute relationships is of significant use within the model learning process. Therefore, this algorithm may be used to convert the extracted entities and attributes into triplet sets of Entity-Attribute-Value form and Entity-Entity-Relationship form.

Frame Net—The results of the extraction and association algorithms may be provided to the SME in a simple to understand and meaningful manner that allows easy manipulation. The use of the Frame Net representation may provide this interface. The Frame Net representation was originally developed for use in linguistic research. The basic premise is that each frame within Frame Net formalizes the meaning of a behavior or attribute. Then, each frame is filled with the supporting words or concepts that describe the particular behavior or attribute. The role of the SME at this point in the process may be to select from the list of entities and attributes those that are of relevance to the area of interest, to combine extracted attributes that provide similar information, and to provide a sensibility check on the entity and attribute associations, and/or add additional associations.

Figure 5:
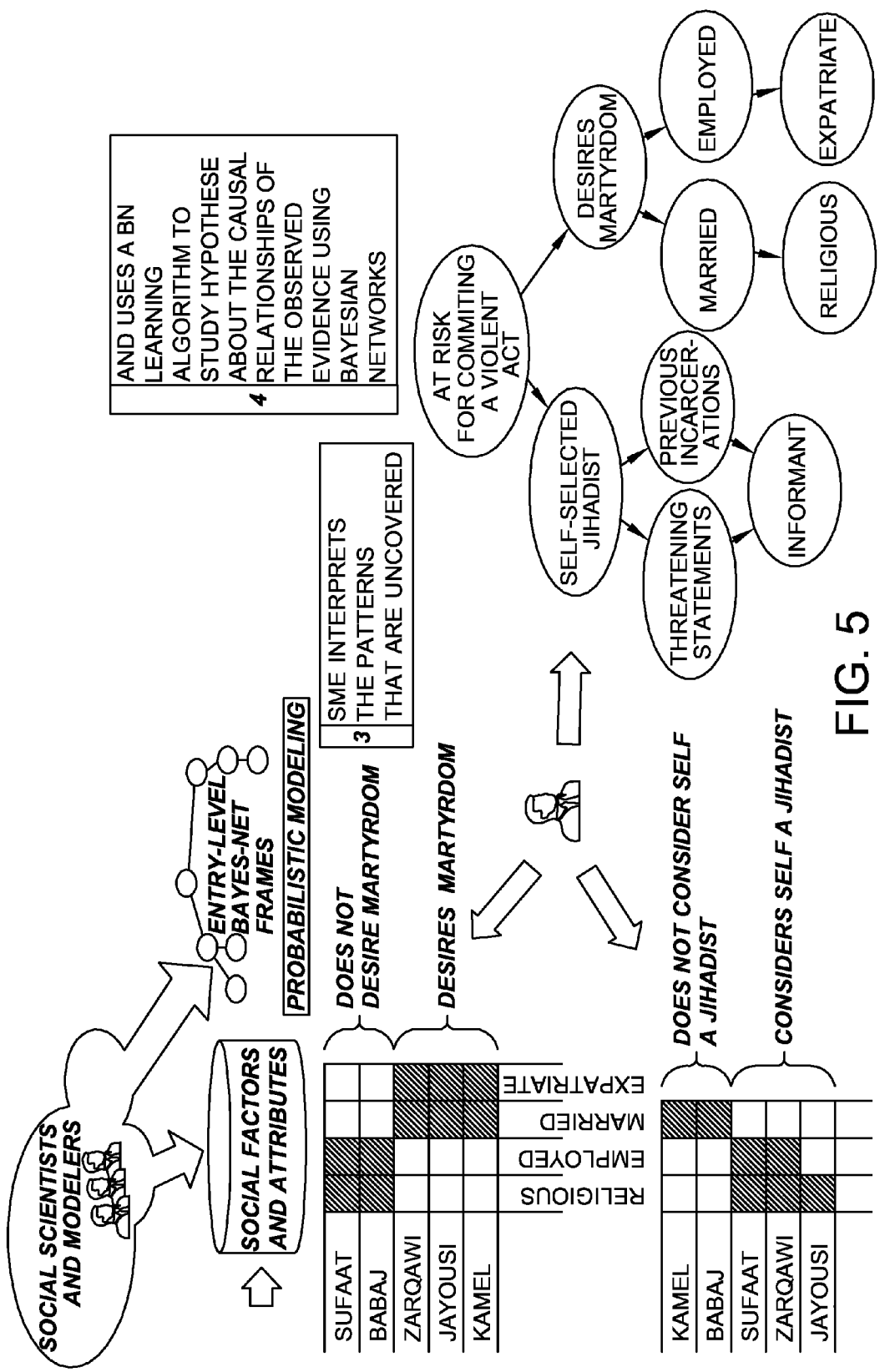
FIG. 5 is a depiction of the Probabilistic Modeling Phase of the offline workflow.

As described above, the Discovery portion of the invention's workflow provides the following capabilities to the SME: a) Provides access to algorithms that may aid in the extraction of entities, attributes, behaviors, and themes from large scale structured and unstructured historic text corpora. b) Provides algorithms for converting the extracted information into usable data for model development. This data can assume the form of entity relationships, entity attribute lists, event documentation, social networks, and semantic data models. The Discovery stage focuses on finding the necessary information for the development of a model. The Probabilistic Modeling stage focuses on taking this information and converting it into a predictive model. The Probabilistic Modeling phase is depicted in FIG. 5.—A depiction of the Probabilistic Modeling Phase of the offline workflow. In the third step (3) the SME interprets the patterns that are uncovered in the Discovery phase. In the fourth step (4), the scientist then uses the popMCMC algorithm to study hypotheses about the causes and effects of the observed evidence using Bayesian Networks. This phase results in the creation of mathematical models (Bayesian Networks) which can be used in real-time in the online workflow to determine individuals' behaviors and actions.

The entities, attributes, and their associations discovered during the previous step may still compose a formidably sized collection. Therefore, the categorization of these items may be necessary to allow for a manageable collection to be provided to the time and computationally intensive steps in the model learning algorithm. The present invention has developed algorithms capable of categorizing elements in the two following ways:

Entity-Attribute Categorization—This algorithm takes in Entity-Attribute-Value triplets and automatically determines the number of kinds of objects contained within the data and how many categories of objects there are within each kind of object. It then assigns the attributes to the kind of object that the attribute describes and the objects to the categories that they belong to. The resulting categorization may be used to determine how to segment the data for the learning algorithm.

Entity-Entity Categorization—This algorithm takes in Entity-Entity-Relationship triplets and automatically determines rules which govern which types of entities have which type of relationships with each other entity type. These rules may be used to help determine how many segments the data set needs to be broken into and may later be used within the integration technologies to help determine how to connect the segmented components.

The role of the SME in this step of the process may be to validate the categorization of the entities, attributes, and relationships. Through this role they may be able to add, remove, and/or merge categories and add/remove entities, attributes, and relationships from specific categories. Now that the information has been segmented into small enough pieces, the expensive portions of the model learning algorithm—the Bayesian Network Learning algorithms can be used to find small scale models that describe each of the segmented components. Each of these segments may now be converted into an Object Oriented Bayesian Network (OOBN). The purpose of each segment may be to develop a predictive model that may be able to ingest information about an entity and determine the probability that the entity may exhibit a specific behavior. Generally, when building Bayesian network models of individuals or groups, a subject matter expert is brought in to develop the models from scratch. These models are often hard to verify, difficult to generalize to new applications, and labor-intensive to create. To address these issues, the present invention utilizes an approach that creates reusable components by using a data-driven learning process. Since each high-level feature is formed from characteristic attributes that it depends on, the present invention can generate the variables and states necessary to build a Bayesian network modeling that feature. A subject matter expert is responsible for making sure the variables and states produced by the system make sense. If conditional probabilities or arc directions need to be modified, the user interface may make performing those modifications easy.

Figure 6:
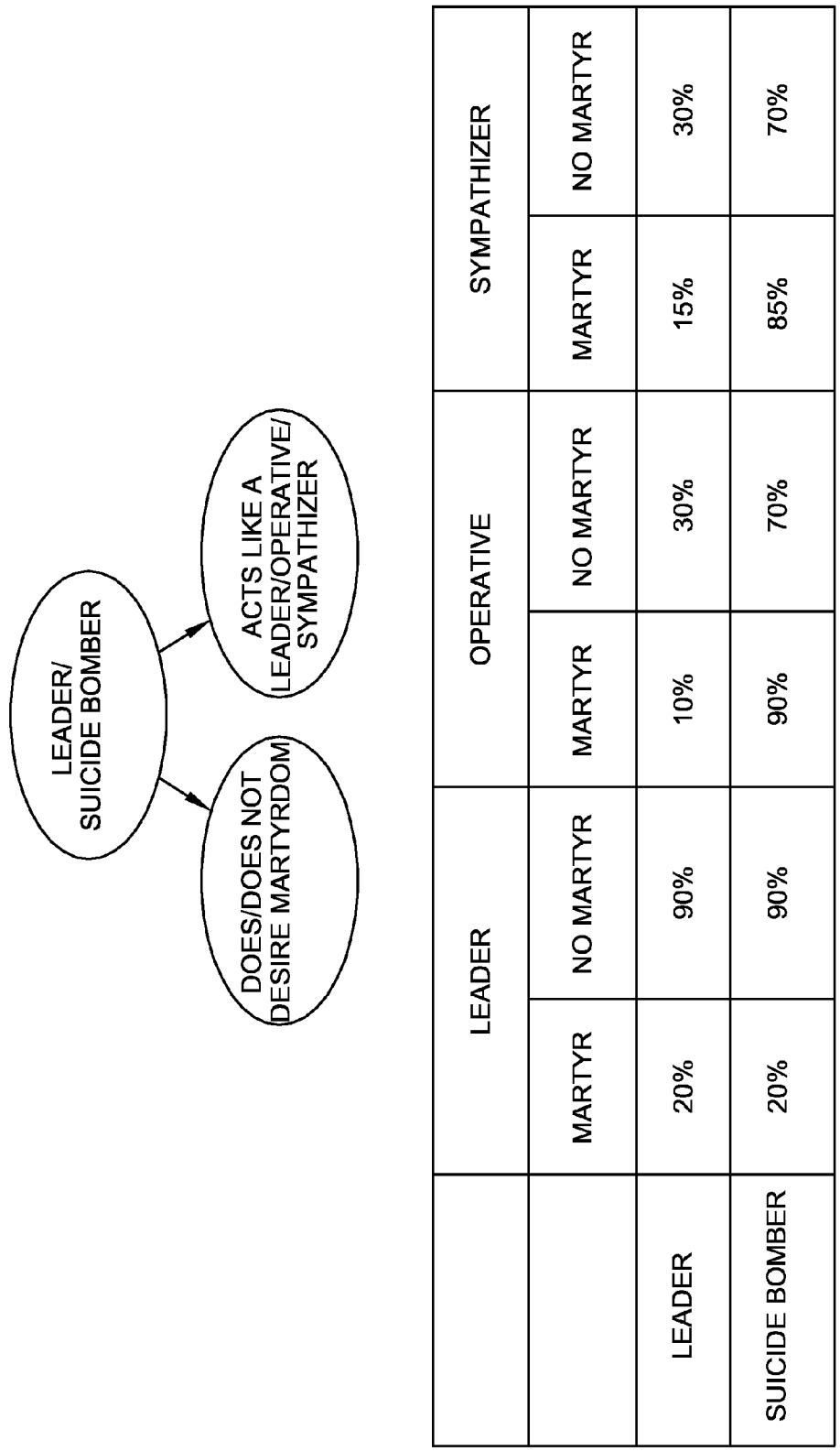
FIG. 6 is an example of an entity-level Bayesian Network (BN) frame generated by the Bayesian Network discovery algorithm.

FIG. 6 shows an example of an entity-level Bayesian Network (BN) frame generated by the Bayesian network discovery algorithm. A Metropolis-Hastings Sampler (MHS) is a learning Algorithm (LA). The Bayesian network discovery algorithm is a hybrid algorithm. This algorithm uses statistical information from a population of MHSs to inform the proposal distributions for individual samplers in the population. Markov chain Monte Carlo (MCMC) is a general purpose class of approximation methods for complex inference, search and optimization problems. An MCMC is a stochastic simulation that visits solutions with long term frequency equal to the Boltzmann, or free energy minimizing, distribution. A variety of MCMC samplers can be constructed for any given problem by varying the sampling distribution subject to conditions that ensure convergence to the Boltzmann distribution. Samplers with the same long-run frequency distribution can vary greatly in their short-term dynamics. One of the objectives is to design samplers that rapidly reach low energy solutions but resist becoming trapped in local basins of attraction.

A Bayesian network (BN), or directed graphical model, specifies a joint probability distribution over a collection of random variables as a graph encoding conditional independence relationship and a set of local distributions encoding probability information. Each node in the graph represents a random variable that is conditionally independent of its non-descendants given its parents. The local distributions at each node specify a set of probability distributions for the associated random variable, one for each combination of values for the node's parents. The local distributions implicitly encode a joint distribution over configurations of the random variables that satisfy the independence assumptions implied by the graph. In Bayesian learning, a prior distribution is defined over graph structures and local distributions, and the cases are used to infer a posterior distribution. The common approach is to assign a prior probability q(G) to each graph and independent Dirichlet distributions $g(\theta|G)$ for each of the local conditional distributions $\theta$.

The Probabilistic Modeling portion of the present invention provides the following capabilities to the SME: a). access to categorization algorithms that aid in the separation of the numerous discovered entities and attributes into classifications for easier analysis; b). Provides algorithms for the automatic learning of the governing predictive models for each classification of entities; c). access to the results of the algorithms to validate and/or modify the results of the model construction process.

The System Modeling and Analysis portion of the workflow happens online. At this point, the SMEs have created mathematical models that represent behavior and attributes. This portion of the framework provides the capability to utilize those models in real-time against incoming data. As data is observed, new Bayesian Network Frames (the template of which was generated by the SME) may be created and populated with the new information. Then the automated Markov Chain Monte Carlo (MCMC) algorithm may work to combine those frames in different ways to explain relationships between entities and events. Analysts may work with the ongoing results of the generated hypotheses and apply their own knowledge of the data to constrain the problem. This results in models that are feeding analysts with SME knowledge in real-time and allowing them to update and examine the new data against the known models.

Figure 7:
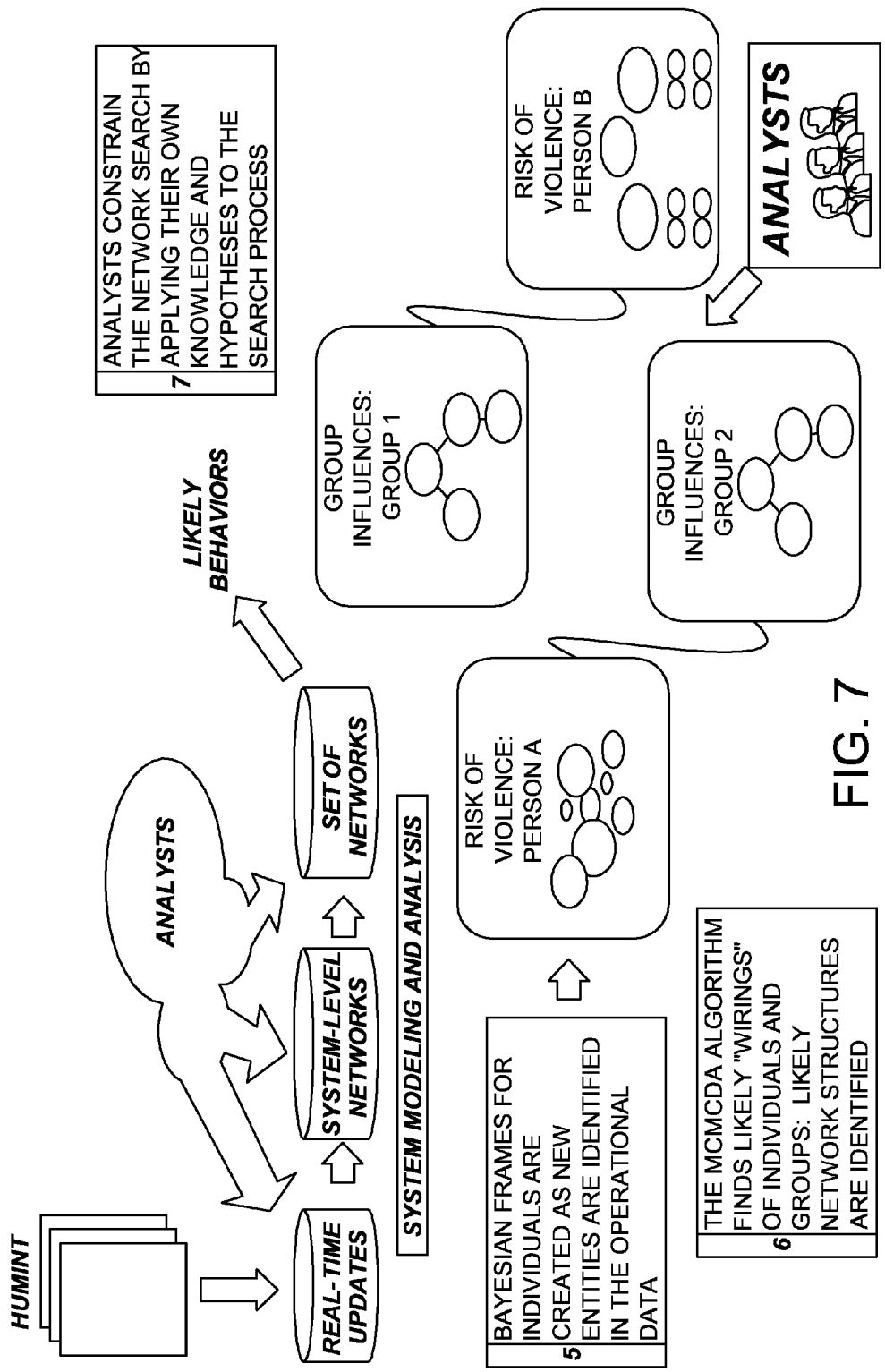
FIG. 7 is a depiction of the System Modeling and Analysis portion of the on-line workflow.

With reference now to FIG. 7—Depiction of the System Modeling and Analysis portion of the workflow. In the fifth step (5), the Bayesian frames for individuals and groups are created as new entities and are identified in the operational data. In step six (6), the Markov Chain Monte Carlo Data Association (MCMCDA) algorithm finds likely social network structures and presents those likely network structures to the analyst. MCMCDA is used for solving data association problems arising in multiple-target tracking in a cluttered environment. When the number of targets is fixed, the single-scan version of MCMCDA approximates joint probabilistic data association (JPDA). The single-scan MCMCDA algorithm provides a fully polynomial randomized approximation scheme for JPDA. For general multiple-target tracking problems, in which unknown numbers of targets appear and disappear at random times, a multi-scan MCMCDA algorithm approximates the optimal Bayesian filter. It performs better under extreme conditions, such as a large number of targets in a dense environment, low detection probabilities, and high false alarm rates.

Multiple-target tracking plays an important role in many areas of engineering. Under the general setup, some indistinguishable targets move continuously in a given region, typically independently, according to a known, Markovian process. Targets arise at random in space and time, persist for a random length of time, and then cease to exist; the sequence of states that a target follows during its lifetime is called a track. The positions of moving targets are measured, either at random intervals or, more typically, in periodic scans that measure the positions of all targets simultaneously. The position measurements are noisy and occur with detection probability less than one, and there is a noise background of spurious position reports, i.e., false alarms. The essence of the multiple-target tracking problem is to find tracks from the noisy measurements. Now, if the sequence of measurements associated with each target is known, multiple target tracking (at least under the assumption of independent motion) reduces to a set of state estimation problems. Usually, the association between measurements and targets is unknown. The data association problem works out which measurements were generated by which targets; more precisely, it requires a partition of measurements such that each element of a partition is a collection of measurements generated by a single target or clutter. In the general case, uncertainty as to the correct association is unavoidable. The Bayesian approach generates optimal filtering predictions by summing over all possible associations, weighted by their probabilities. Under certain distributional assumptions, the optimal Bayesian filter minimizes the mean squared error in the track estimates.

Tracking algorithms can also be categorized by the way in which they process measurements: single-scan algorithms estimate the current states of targets based on their previously computed tracks and the current scan of measurements. Multi-scan algorithms may revisit past scans when processing each new scan, and can thereby revise previous association decisions in the light of new evidence.

As a real-time multiple-target tracking method, MCM-CDA is a true approximation scheme for the optimal Bayesian filter; i.e., when run with unlimited resources, it converges to the Bayesian solution. As the name suggests. MCMCDA uses Markov chain Monte Carlo (MCMC) sampling instead of summing over all possible associations. MCMCDA incorporates missing measurements, false alarms and an ability to initiate and terminate tracks. The algorithm can be applied to the full range of data association problems.

Finally, in step seven (7), the analysts constrain the network search by applying their own knowledge and hypotheses to the search process.

Although it is necessary to segment the problem into small enough pieces to allow for small scale models to be developed, the goal of this system is to develop a full-scale model that describes all of the components within a single behavioral model. Therefore, the final step in the present invention's workflow is to combine each of the small-scale models into a large conglomerated behavioral prediction model. The result of the previous step may be a group of individual BNs describing the behavior of specific types of entities. This integration step may utilize the rules developed through the Entity-Entity Categorization algorithm along with the Bayesian Network Learning algorithms to develop the large scale predictive model.

The result of this step may be a set of Probabilistic Behavior Models that may describe the potential of individuals and organizations to exhibit specific behavioral patterns under a range of potential situations. These models may allow for the analysis of "what-if" scenarios, the determination of the motivation of individuals, the assignment of individuals to classifications, etc.

The System Modeling and Analysis portion of the present invention provides the following capabilities to intelligence analysts: a). Algorithms for the conglomeration of the individual models into a large-scale behavioral prediction model; b). Access to the results of the algorithms to validate and/or modify the results of the model construction process.

The successful completion of the above steps may result in a system that is able to combine automatically learned information with SME knowledge to form behavioral prediction models. To facilitate an intuitive understanding of the properties and benefits of this effort, the user may be able to interact with the resultant models to evaluate and utilize them for advanced intelligence analysis.

One embodiment demonstrates and describes six different algorithms described above, including content discovery, Entity & Attribute Association, Latent Structure Discovery, BN Structure Discovery, Associate Entity-Level Frames. Finding Optimal Bayes Net. The details of these algorithms are shown below.

Algorithm 1: Content Discovery:

The goal of the content discovery step is to build a formal model of the meaning of the historical data available to social scientists and modelers. The type of data that the present invention is concentrating on unstructured English text. The text-based content discovery algorithm is a Semantic Role Labeling (SRL) algorithm built on a frame-based model of text meaning called FrameNet. It is able to identify the key ideas, called frames, which are present in unstructured text, and can map phrases from the text into the concepts associated with the frames. For example, given the following input sentences:

The undocumented containers were smuggled from Elsam Galagh to Heart by truck.

A source reported that Farooq bought a large quantity of farm equipment from Ubaid.

The weapons were smuggled from Peshawar last Friday.

Surhin resides in Peshawar.

The SRL capability would generate a formal model of the frames (key ideas in the text) and the elements (concepts associated with the ideas). A section of the frame-based semantic model generated by the example sentences above is shown in Table 1.

TABLE 1

| | |
|---|---|
| The undocumented containers were SMUGGLED from Elsam Galagh to Heart by truck | SMUGGLING Perpetrator Source |
| A source reported that Farooq BOUGHT a large quantity of farm equipment from Ubaid | COMMERCe BUY Buyer Goods Seller |
| The weapons were SMUGGLED from Peshawar last Friday | SMUGGLING Perpetrator Source Goods |
| Surhin RESIDES in Peshawar | RESIDENCE Resident Location |

The left-hand column shows the frame-based labeling of each sentence. The right-hand column shows the legend. The words (smuggled, bought, resides) are the frame-evoking words—words that introduce the fundamental ideas in the sentence. The corresponding terms (smuggling, commerce_buy, residence) list the names of the FrameNet-frames that are evoked by the words. The other phrases represent the text mapped to the concepts related to the frames found within each sentence. For example, the FrameNet definition of the Commerce_buy frame specifies that the concept of buying is often associated with sub-ideas (called frame elements) such as the entity which is doing the buying, the goods bought and the entity who sold the goods. The sentence "A source reported that Farooq bought a large quantity of farm equipment from Ubaid." evokes the notion of a commercial transaction through the word "bought" and contains information about the buyer, seller, and the goods exchanged. The SRL capability identifies this frame and explicitly labels the portions of the sentence that map to elements of the Commerce_buy frame.

Content Discovery—Input

The input to the content discovery algorithm is unstructured English text. Internally, the algorithms represent the input data as sets of documents, with the content of each document stored as a Unicode string. A set of import utilities convert text from various external formats (e.g. HTML, native formats from word processing software, . . . ) into the Unicode format used in the algorithm chain.

Content Discovery—Output

The two components of the output to the content discovery phase of processing are:

1. Mapping of terms to FrameNet frames—The content discovery algorithm delivers a mapping between words and terms in the input text and frames defined by the linguistic resource FrameNet.

2. Mapping of phrases to FrameNet frame elements—The content discovery algorithm produces a mapping between words and phrases in the target text and elements of the frames evoked by the text.

Algorithm2: Entity & Attribute Association

In the Entity & Attribute Associate stage of processing, the frame-based representation of text meaning is combined with knowledge of the entities discussed in the input data set to yield a variety of formal models of entity behavior and attributes. This stage of processing relies on entity extraction and co-reference resolution algorithms to identify the distinct entities described by unstructured text.

Entity Extraction algorithms identify portions of unstructured text that mention entities. For example, a well-performing entity extractor would extract the underlined text from the following sentences:

Barak Obama attended the G20 summit in Seoul.

Mr. Obama said he had a number of goals for his trip to Seoul, Korea.

A co-reference resolution algorithm determines which distinct entity references refer to the same entity. A well-performing co-reference resolution algorithm would indicate that the person Barak Obama and the location Seoul from the first sentence above referred to the same person and location as Mr. Obama and Seoul, Korea in the second sentence.

The present invention does not rely on a particular method for performing entity extraction or co-reference resolution.

The Entity & Attribute Association portion of the invention's algorithm chain combines the entities found with entity extraction and co-reference resolution algorithms with the frame-based model of text meaning resulting from the content discovery step. The result is a data set that can be used to generate a variety of highly structured records that describe the attributes and behaviors of the entities discussed in the original text.

Entity & Attribute Association—Input

There are two inputs to the Entity & Attribute Association stage of processing:

1. The output of the content discovery stage (the frame-based model of text meaning)

2. The results of entity extraction and co-reference resolution.

Entity & Attribute Association—Output

There are many possible results of the Entity & Attribute Association stage of processing. All are highly structured forms of the input data. The system works with the SME to determine which of the possible structured forms that can be generated is appropriate for the domain of analysis and raw data that is available. Many of the possible results of this stage of processing are described below:

Entity Attribute Value Table

An Entity Attribute/Value (EAV) table is a two-dimensional table in which one dimension (the rows, in the following examples) corresponds to a unique entity and the other dimension (the columns) stores different attributes of the entities. An abstract EAV table is shown in Table 2.

TABLE 2

| | Attribute 1 | Attribute 2 | . . . |
|---|---|---|---|
| Entity 1 | value | value | |
| Entity 2 | value | value | |
| . . . | | | |

The rows (the entities) are drawn from the results of the co-reference resolution results. Each row represents one unique entity that may be mentioned multiple times in the source data. The example sentences above would yield two entities (Barak Obama and Seoul Korea) since only two unique entities were mentioned in the source sentences. The rows of an EAV table may be filtered to contain only a subset of all the entities discussed in the source data. Common filtering techniques include:

only include entities that represent people (individuals);

only include entities that represent locations;

only include entities that represent organizations; and, only include entities for which sufficient data is available.

There are a number of strategies for constructing columns in an EAV table.

Figure 8:
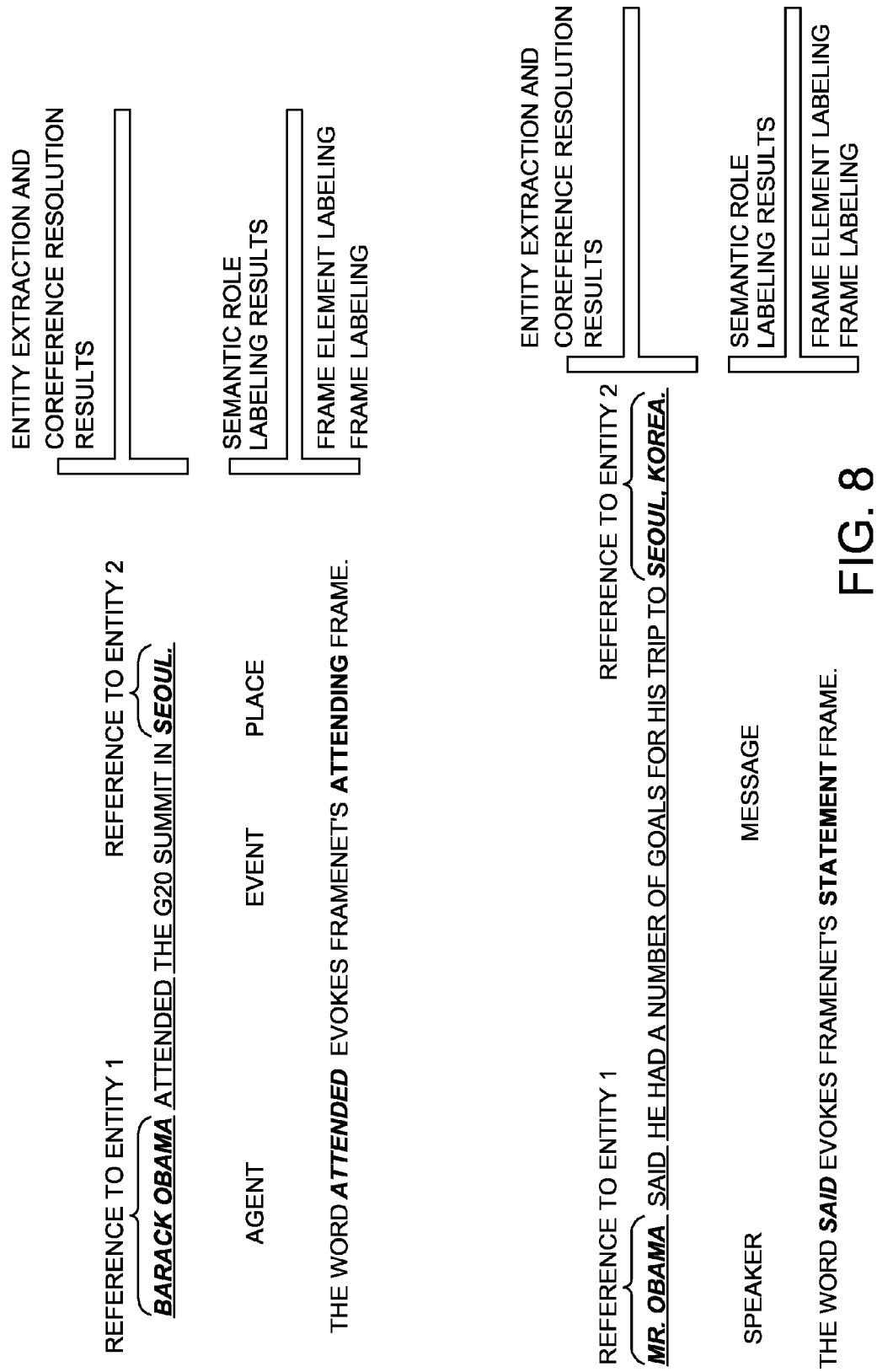
FIG. 8 shows the frames evoked by two example sentences.

Several are described in FIG. 8 in terms of this example.

This example depicts the frames evoked by two example sentences, the sections of the text that have been associated with some of those frame's elements, and the results of entity extraction and co-reference resolution.

Some of the attribute strategies used in the present invention are:

Frame

Frame attributes are simply the names of the frames in which entities are referenced. The EAV table 3 below shows a frame-based attribute strategy:

TABLE 3

|  | Attending | Statement |
| --- | --- | --- |
| Entity 1 (Barak Obama) | 1 | 1 |
| Entity 2 (Seoul) | 1 | 1 |

The table 3 contains columns for each of the frames encountered in the target text. Each cell contains some indication (a Boolean flag or a reference count, for example) of the row's entity's association with the frame. In this example, each cell contains the value "1" indicating that references to each entity had a single association with each of the frame types identified in the text.

Frame Element

An EAV table constructed with a frame element attribute strategy including a column for each frame element is shown in Table 4.

TABLE 4

|  | Agent | Speaker | Place | Message |
| --- | --- | --- | --- | --- |
| Entity 1 (Barak Obama) | 1 | 1 |  |  |
| Entity 2 (Seoul) |  |  | 1 | 1 |

Each column in an element-type EAV table represents one frame element found within the source data. A cell is filled with a flag or count representing the number of times the row's entity was referred to within the column's frame element. For example, Seoul/Message is filled with a '1' because it was referred to within the Message element of a Statement frame.

Frame/Element

The frame/element strategy treats each frame/element combination as a unique attribute. Under this strategy, an entity's appearance in the Speaker element of a Statement frame would be treated as a different attribute than its appearance in the Speaker element of a Revealing_secrets frame. The EAV table for the example sentences using the frame/element strategy is shown in Table 5.

TABLE 5

|  | Attending/Agent | Statement/Speaker | Attending/Place | Statement/Message |
| --- | --- | --- | --- | --- |
| Entity 1 (Barak Obama) | 1 | 1 |  |  |
| Entity 2 (Seoul) |  |  | 1 | 1 |

Entity Adjacency Matrix

Figure 9:
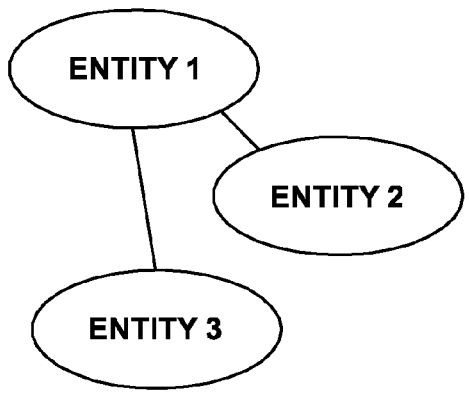
FIG. 9 shows an Entity Adjacency Matrix (EAM)

An Entity Adjacency Matrix (EAM) is shown in FIG. 9. The EAM is a data structure that indicates which entities have relationships with other entities. The EAM is a tabular way of expressing a graph—data comprised of nodes connected by edges. The example table below represents a three node graph with undirected (symmetric) edges between nodes. A picture of the nodes and edges is shown to the right of the table.

Figure 10:
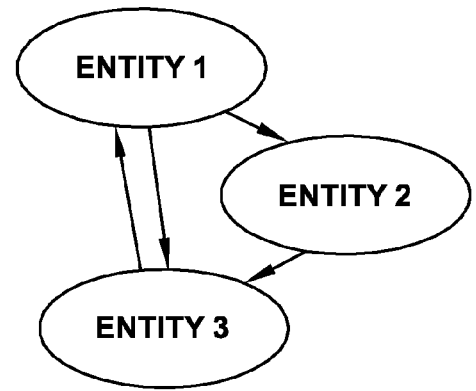
FIG. 10 shows the EAM can also represent a directed graph.

Another embodiment of EAM is shown in FIG. 10. The EAM can also represent a directed graph, one in which the relationships between nodes are not symmetric. The table and graph below represent the same set of directed relationships between nodes.

Figure 11:
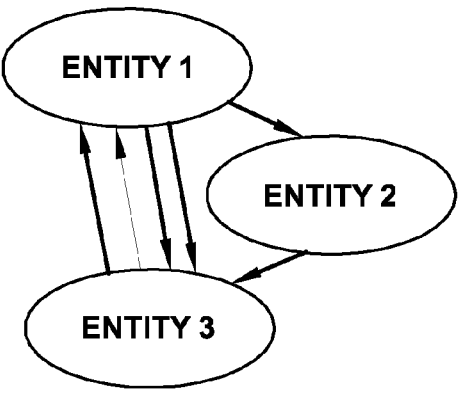
FIG. 11 shows the EAM can be used to express a variety of relationship types.

Finally, the EAM can be used to express a variety of relationship types as shown in FIG. 11. The example below shows how a number of different types of relationships can be expressed in tabular and graphical form.

In the present invention, the type of the frame that links entities can be encoded as an edge type. For example, an EAV table that accounted for frame-based edge type from the example sentences above might look like Table 6.

TABLE 6

|  | Martyrdom (corresponds to the first kind in FIG. 1) | Role (corresponds to the second kind in FIG. 1) |
| --- | --- | --- |
| Captured fighter A | does not desire | sympathizer |
| suspect B | desires | leader |
| captured fighter C | does not desire | operative |
| victim D | does not desire | operative |
| suicide bomber E | desires | operative |
| captured fighter F | desires | operative |
| suspect G | desires | leader |
| suspect H | does not desire | sympathizer |

Algorithm 3: Latent Structure Discovery

The Latent Structure Discovery phase of processing seeks to find sensible ways of categorizing the entities described by the target data and summarizing their behavior. There are two parts to this: Attribute discovery and Behavior discovery.

Attribute Discovery

Attribute discovery algorithms take as input the EAV tables that are generated by the Entity & Attribute Association algorithm. They generate ways of partitioning and sorting the tables so as to show distinct clusters and patterns of attributes. An example of this process is shown below in FIG. 14.

Figure 14:
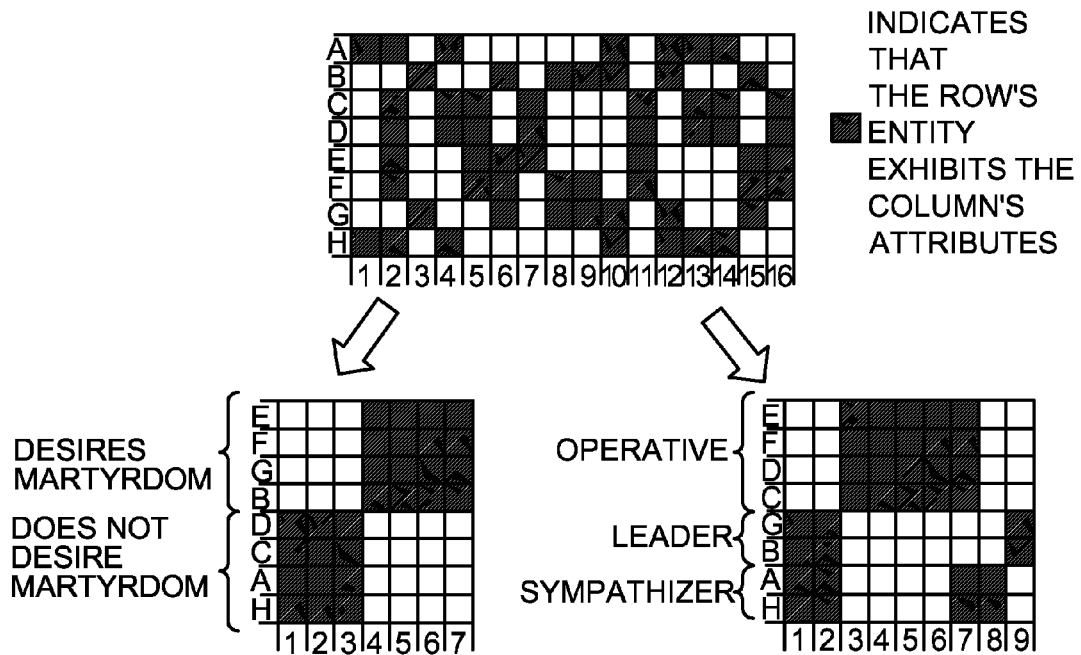
FIG. 14 shows the attribute discovery stage of processing a two-level organization of kinds and categories of the source data.

The top table in FIG. 14 represents an EAV table of the type that is generated by the Entity & Attribute Associate stage of processing. In FIG. 14, A represents "captured figher," B represents "suspect," C represents "captured fighter," D represents "victim," E represents "suicide bomber," F represents "captured fighter," G represents "suspect," and H represents "informant." In the top diagram, 1 represents "business owner," 2 represents "relatives in prison," 3 represents "suspicious phone calls." 4 represents "married," 5 represents "elementary education," 6 represents "unemployed," 7 represents "under 25." 8 represents "observed with a group," 9 represents "recent pilgrimage," 10 represents "high school education," 11 represents "observed with a weapon," 12 represents "former Baath member," 13 represents "Iraqi citizen," 14 represents "ex-military." 15 represents "male." and 16 represents "served time in prison". The bottom part of FIG. 14 shows the results of Latent Structure Discovery: a partition of the table into two kinds, and a sub-partition of each kind into categories. The first kind exposes the fact that a small set of attributes (1=Iraqi citizen, 2=ex-military, 3=married, 4=unemployed, 5=mule, 6=recent pilgrimage, and 7=Under 25) can be used to group entities into two distinct categories—those who desire martyrdom and those who do not. The second kind exposes the fact that another subset of attributes (1=high school education, 2=former Baath member, 3 served time in prison, 4=elementary education, 5 observed with a weapon, 6=observed with a group, 7=relatives in prison, 8=business owner, and 9=Suspicious phone calls) can clearly be used to group entities into three categories—operatives, leaders, and sympathizers.

More formally, the result of Attribute Discovery is the following:
A set of kinds, where each kind consists of
a subset of the attributes of an EAV table; and,
a grouping of the entities in an EAV table into distinct categories. Each of a kind's category can be represented as a list of entities. All entities are placed in exactly one category for a particular kind.

Behavior Discovery Algorithm

Behavior discovery algorithms take as input an Entity Adjacency Matrix (EAM) generated by the Entity & Attribute Association stage of processing. They discover ways of permuting these matrices to uncover patterns of entity interaction. Examples of Behavior Discovery results are shown below in FIG. 15.

Figure 15:
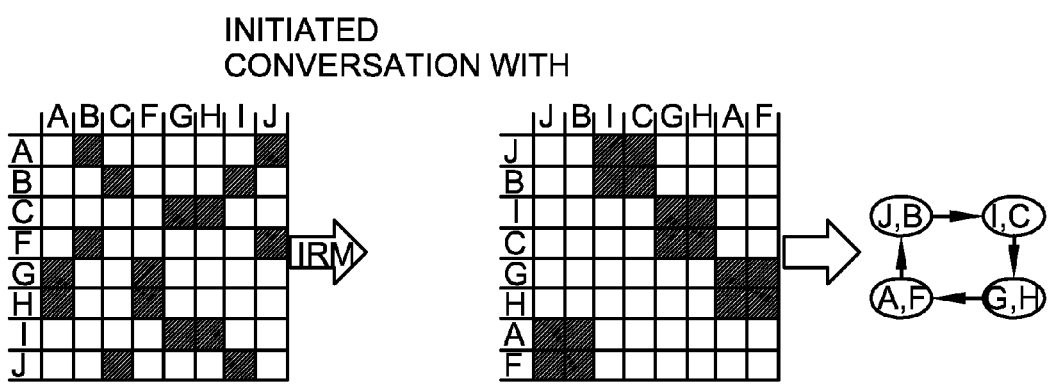
FIG. 15 shows an example of Behavior Discovery Algorithm results.

In FIG. 15, the vertical letters represent, as follows: A=captured fighter, B=suspect, C=captured fighter, F=captured fighter, G=suspect, H=suspect, I=fighter, and J=fighter, an EAM was generated that shows "contacting" relationship between entities: cells are filled in when the row entity initiated contact with the column's entity. The Behavior Discovery algorithm finds a permutation of the rows and columns that highlights patterns in the entity interaction. From this, we now understand which groups of entities are likely to initiate contact with other groups of entities.

The output of the Behavior Discovery stage of processing is a set of graphs like the one shown on the right in FIG. 15. The graph's nodes contain sets of entities and the arrows between the nodes represent the type of relationship. In a typical scenario, analysts may produce many EAMs to represent the many different kinds of relationships entities may have with one another. Behavior discovery may generate one graph like the one shown in FIG. 15 for each EAM that is given to it.

Algorithm 4: BN Structure Discovery

The BN Structure Discovery stage of processing builds probabilistic models of the entities in the source data.

BN Structure Discovery Input

Input to this stage of processing consists of the output of the Attribute Discovery algorithm cast into a tabular form.

BN Structure Discovery Output

Figure 12:
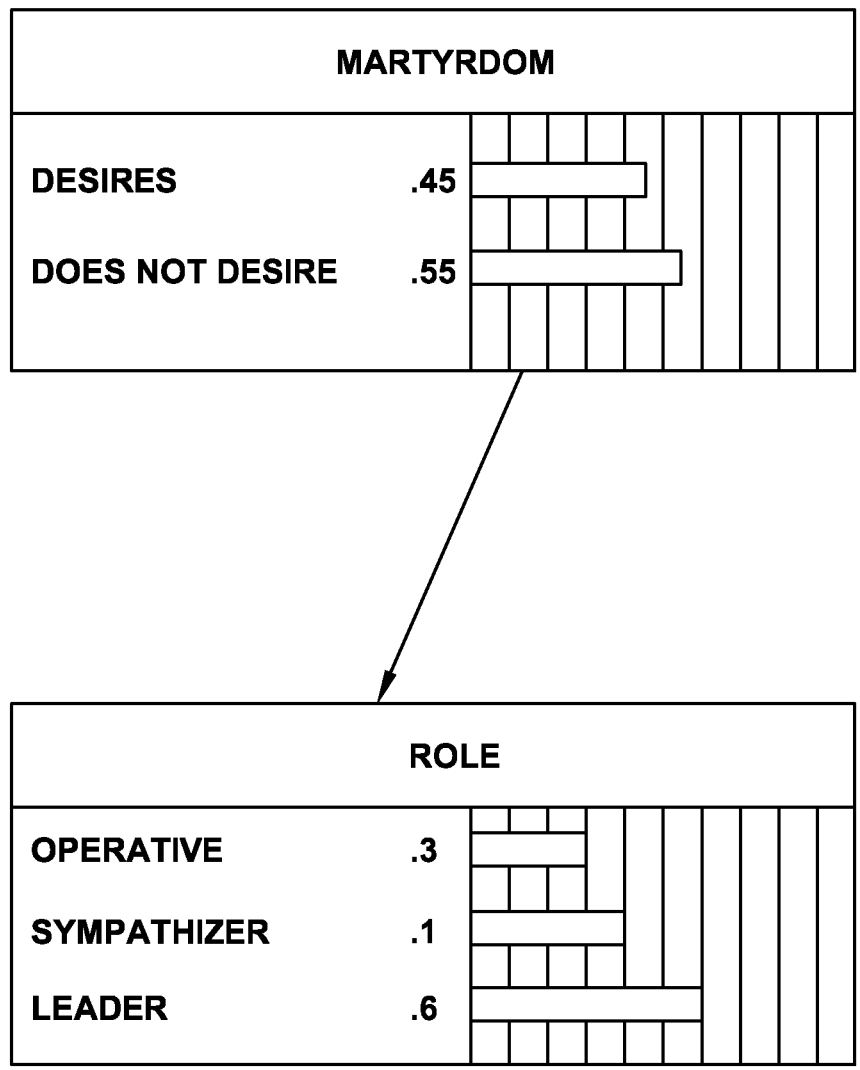
FIG. 12 shows a Conditional Probability Table of each node allows the node to take on the values of the categories that make up the node's kinds.
Figure 13:
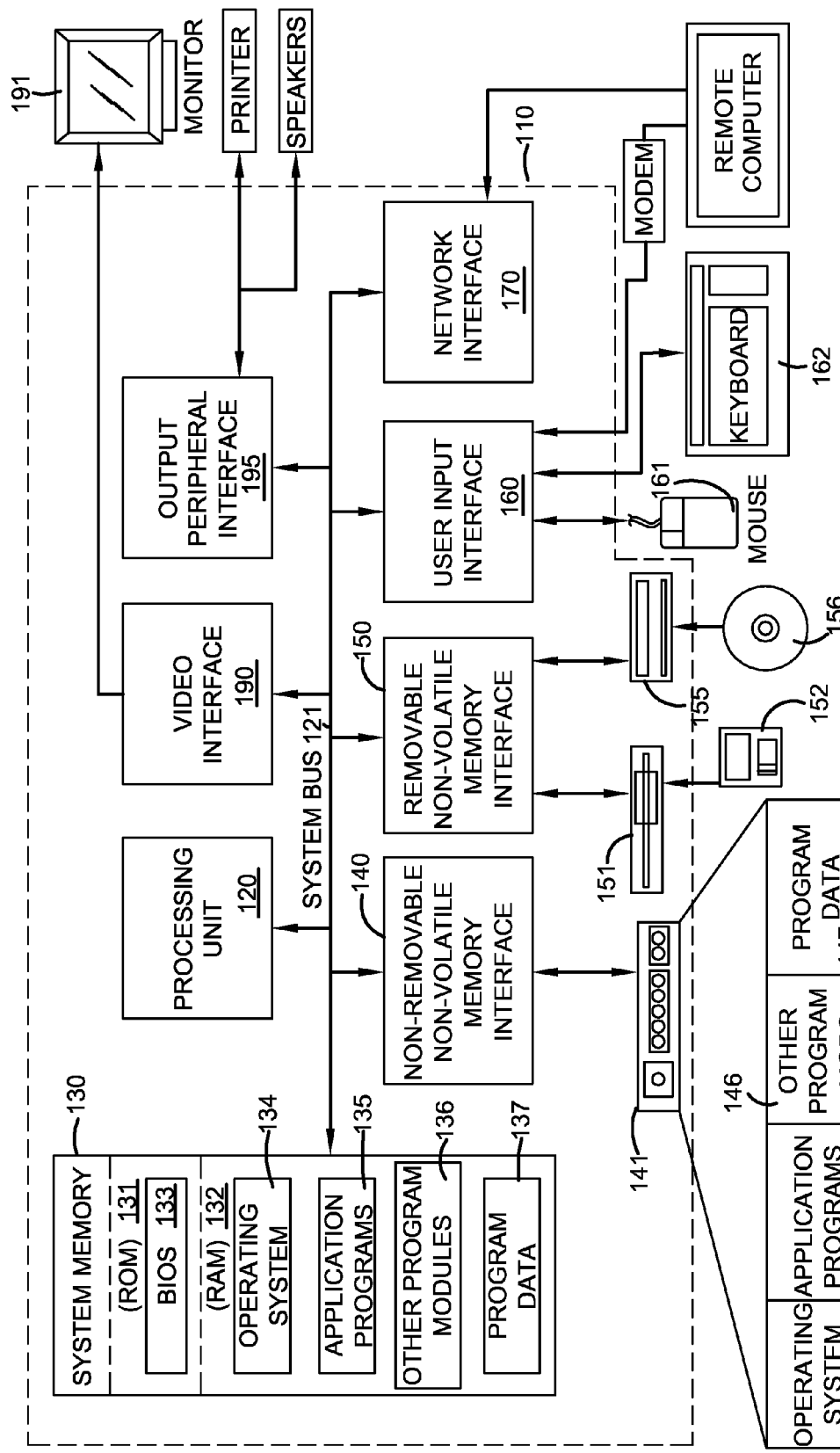
FIG. 13 shows a computer system.

The output of the BN Structure Discovery algorithm is a discrete Bayesian Network with one node per kind (column in the input data). The Conditional Probability Table of each node allows the node to take on the values of the categories that make up the node's kinds. An example is shown in FIG. 12.

The BN Structure Discovery algorithm finds dependence relationships between the nodes (the arrows) and values for the Conditional Probability Tables that provide a good form to the input data.

The Bayesian Network developed by this stage of processing acts as a probabilistic model of an entity and is called an entity frame. In the on-line workflow, entity frames are created for each individual encountered in the operational setting.

Algorithm 5: Associate Entity-Level Frames

The Associate Entity-Level Frames stage of processing is the first stage of the online workflow. The goal is to use new, operationally relevant data (as opposed to the historical data used in the off-line workflow) to build a model that describes the current situation.

Associate Entity-Level Frames Input

This stage of the algorithm chain takes two items as input:
The EAV tables generated from running the Content Discovery and Entity & Attribute Association algorithms on the operational data set; and,
The entity frame models produced by the BN Structure Discovery stage of processing Associate Entity-Level Frames Output This stage of the algorithm chain generates a set of Bayesian Network entity frames that represent each of the entities discovered in the on-line data set. The entity frames are populated with evidence about the entities gathered from the on-line data.

Algorithm 6: Finding Optimal Bayes Net

The goal of the Finding Optimal Bayes Net stage of processing is to assemble the individual entity frames generated from the Associate Entity Level Frames processing stage into a large system-level Bayesian network that provides a good fit for the observed data.

Figure 16:
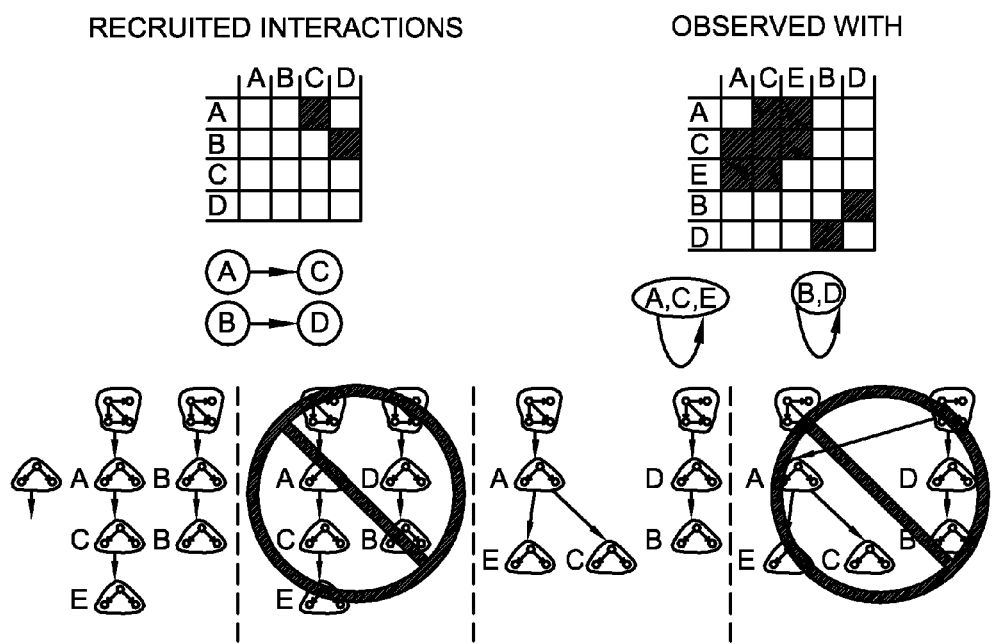
FIG. 16 shows the input and results of the Find Optimal Bayesian Networks stage of processing.

The input and results of the Find Optimal Bayes Net stage of processing are shown in FIG. 16. In FIG. 16, the vertical letters represent as follows: A=captured fighter, B=suspect, C=captured fighter, D=victim, and E=suspect, The input is the set of entity frames and the Behavior Discovery results generated from the Latent Structure Discovery stage of processing. This final stage of processing uses MCMCDA to find a "wiring" of the entity frames that provides a good fit for the observed operational data. The behavior discovery results are used to inform the MCMCDA search procedure to prevent it from dwelling on unproductive regions of the search space.

Numerous embodiments have been described, hereinabove. It may be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:
1. A method for creating a predictive model, the method comprising the steps of:
determining trends and patterns in electronic data, using at least a first machine language algorithm;
refining the determination of the algorithm;
searching for social models that describe the identified trends and patterns using at least a second machine language algorithm;
verifying causal links;
constructing at least one model about human node behavior and interactions;

utilizing the social models to do at least one of the following: validate hypotheses, predict future behavior, and examine hypothetical scenarios;
automatically updating predictions when new data is introduced;
using probabilistic techniques to learn hierarchical structure in unstructured text;
continuously updating a set of themes;
examining grammatical rules of each component of text;
matching grammatical constituents to semantic roles; and,
reorganizing data into clusters of entities with common attributes.

2. The method of claim 1, wherein the step of determining trends and patterns in electronic data, using at least a first machine language algorithm comprises the step of:
using categorization and relational modeling algorithms to identify trends and patterns.

3. The method of claim 2, wherein the method further comprises the steps of:
converting structured and unstructured textual and numerical data into behavioral predictive models; and,
utilizing a probabilistic modeling algorithm to generate entity-level probability models.

4. The method of claim 3, wherein the method further comprises the steps of:
converting extracted entities and attributes into sets of entity-attribute-value and entity-entity-relationship;
automatically determining the number of kinds of objects contained in the entity-attribute-value set;
assigning attributes to the kind of object described; and,
automatically determining rules which govern entities in the entity-entity-relationship set.

5. The method of claim 4, wherein the method further comprises the step of:
converting segments into object-oriented Bayesian Networks.

6. The method of claim 5, wherein the method further comprises the steps of:
linking algorithms with a user interface; and,
parsing each sentence based on parts of speech and relative positions, using a semantic role labeling algorithm, to extract entities and discover relationships between entities.

7. The method of claim 6, wherein the method further comprises the steps of:
utilizing a Bayesian network learning algorithm to analyze causes and effects of observed evidence using Bayesian Networks; and,
creating real-time mathematical models to predict actions.

8. The method of claim 7, wherein the method further comprises the steps of:
creating Bayesian Network frames;
combining frames to explain relationships between entities and events;
determining, using an MCMCDA algorithm, likely social network structures;
approximating joint probabilistic data associations; and,
providing a fully polynomial randomized approximation scheme.

9. A non-transitory computer readable medium containing instructions for a method for creating a predictive model, the computer readable medium comprising the steps of:
determining trends and patterns in electronic data, using at least a first machine language algorithm;
refining the determination of the algorithm;
searching for social models that describe the identified trends and patterns using at least a second machine language algorithm;
verifying causal links;
constructing at least one model about human node behavior and interactions;
utilizing the social models to do at least one of the following: validate hypotheses, predict future behavior, and examine hypothetical scenarios;
automatically updating predictions when new data is introduced;
using probabilistic techniques to learn hierarchical structure in unstructured text;
continuously updating a set of themes;
examining grammatical rules of each component of text;
matching grammatical constituents to semantic roles; and,
reorganizing data into clusters of entities with common attributes.

10. The computer readable medium of claim 9, wherein the step of determining trends and patterns in electronic data, using at least a first machine language algorithm comprises the step of:
using categorization and relational modeling algorithms to identify trends and patterns.

11. The computer readable medium of claim 10, wherein the computer readable medium further comprises the steps of:
converting structured and unstructured text into behavioral predictive models; and,
utilizing a probabilistic modeling algorithm to generate entity-level probability models.

12. The computer readable medium of claim 11, wherein the computer readable medium further comprises the steps of:
converting extracted entities and attributes into sets of entity-attribute-value and entity-entity-relationship;
automatically determining the number of kinds of objects contained in the entity-attribute-value set;
assigning attributes to the kind of object described; and,
automatically determining rules which govern entities in the entity-entity-relationship set.

13. The computer readable medium of claim 12, wherein the computer readable medium further comprises the step of:
converting segments into object-oriented Bayesian Networks.

14. The computer readable medium of claim 13, wherein the computer readable medium further comprises the steps of:
linking algorithms with a user interface; and,
parsing each sentence based on parts of speech and relative positions, using a semantic role labeling algorithm, to extract entities and discover relationships between entities.

15. The computer readable medium of claim 14, wherein the computer readable medium further comprises the steps of:
utilizing a Bayesian network learning algorithm to analyze causes and effects of observed evidence using Bayesian Networks; and,
creating real-time mathematical models to predict actions.

16. The computer readable medium of claim 15, wherein the computer readable medium further comprises the steps of:
creating Bayesian Network frames;
combining frames to explain relationships between entities and events;
determining, using an MCMCDA algorithm, likely social network structures;
approximating joint probabilistic data associations; and,
providing a fully polynomial randomized approximation scheme.

* * * * *